United States Patent [19]

Meininger et al.

[11] 3,939,140

[45] Feb. 17, 1976

[54] PROCESS FOR THE PREPARATION OF A DYESTUFF CONSISTING SUBSTANTIALLY OF ONLY UNSYMMETRICAL 1:2-CHROMIUM COMPLEX AZO DYESTUFFS

[75] Inventors: Fritz Meininger, Frankfurt am Main; Hermann Fuchs, Kelkheim, Taunus, both of Germany

[73] Assignee: Hoechst Aktiengesellschaft, Frankfurt am Main, Germany

[22] Filed: June 17, 1974

[21] Appl. No.: 480,206

Related U.S. Application Data

[63] Continuation of Ser. No. 245,767, April 20, 1972, abandoned.

[30] Foreign Application Priority Data

Apr. 23, 1971 Germany............................ 2119830

[52] U.S. Cl.......... 260/145 A; 260/145 B; 260/163; 260/193; 260/197; 260/202
[51] Int. Cl.²..................... C09B 45/06; C09B 45/16
[58] Field of Search...................... 260/145 A, 145 B

[56] References Cited
UNITED STATES PATENTS

| | | |
|---|---|---|
| 2,832,760 | 4/1958 | Zickendraht et al............ 260/145 B |
| 2,933,489 | 4/1960 | Biedermann et al............ 260/145 A |
| 3,185,676 | 5/1965 | Klein................. 260/145 A |
| 3,221,003 | 11/1965 | Scholl et al...................... 260/145 A |
| 3,314,932 | 4/1967 | Scholl et al....................... 26/145 A |
| 3,516,979 | 6/1970 | Dore et al........................ 260/145 A |
| 3,516,980 | 6/1970 | Dore et al........................ 260/145 A |
| 3,522,231 | 7/1970 | Bitterlin.......................... 260/145 A |
| 3,625,937 | 12/1971 | Scholl.............................. 260/145 B |
| 3,632,568 | 1/1972 | Neier................................ 260/145 A |

*Primary Examiner*—Floyd D. Higel
*Attorney, Agent, or Firm*—Curtis, Morris & Safford

[57] ABSTRACT

Process for preparing a dyestuff consisting essentially of only unsymmetrical 1:2-chromium complex azo dyestuffs by heating a mixture of o,o'-dihydroxy azo dyestuffs and o-carboxy-o'-hydroxy azo dyestuffs, both being free from sulfonic acid groups, with chromium-III chloride in an organic solvent at a temperature of 105° to 120°C until the portion of o,o'-dihydroxy azo dyestuff is completely metallized and completing the 1:2-chromium complex formation by adjusting the pH-value to 5.0–6.5, and heating at a temperature of 70° to 90°C.

15 Claims, No Drawings

PROCESS FOR THE PREPARATION OF A DYESTUFF CONSISTING SUBSTANTIALLY OF ONLY UNSYMMETRICAL 1:2-CHROMIUM COMPLEX AZO DYESTUFFS

This is a continuation, of application Ser. No. 245,767 filed Apr. 20, 1972, now abandoned.

The present invention relates to a process for the preparation of unsymmetrical 1:2-chromium complex azo dyestuffs.

It is known that, for the preparation of unsymmetrical 1:2-chromium complex azo dyestuffs containing, per atom of chromium, an o,o'-dihydroxy azo dyestuff and an o-carboxy-o'-hydroxy azo dyestuff in complex bound form, the 1:1-chromium complex compound of the o,o'-dihydroxy azo dyestuff is prepared in pure form in a first reaction step, followed by a second step in which this compound is reacted with the o-carboxy-o'-hydroxy azo dyestuff. This process is disclosed, for example in German Auslegeschrift No. 1 254 785 and in German Offenlegungsschrift No. 1 644 219.

It has now been found that such unsymmetrical 1:2-chromium complex azo dyestuffs of the formula (1)

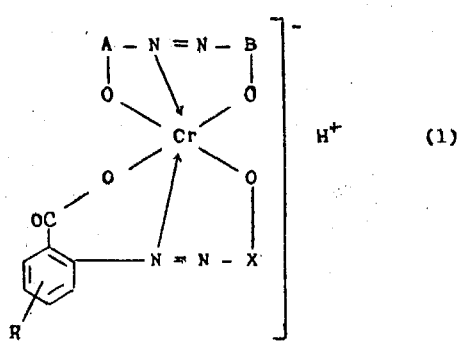

in which A stands for a phenylene radical which is free from sulfonic acid groups and which may be substituted, for example by a chlorine or bromine atom and-/or by a nitro, methyl, ethyl, methoxy, ethoxy, sulfamoyl or carbamoyl group, B and X, which may be identical or different, each stands for a radical of a coupling component free from sulfonic acid groups, which belongs to the hydroxy-naphthalene, pyrazolone or acetoacetylarylamide series, and R stands for a hydrogen atom or any substituent, for example a chlorine or bromine atom or a methyl, β-hydroxyethyl-sulfonyl, carboxyl, sulfamoyl, sulfo-N-mono-alkyl-amino or sulfo-N-dialkyl-amino group, the alkyl portion thereof containing 1 to 4 carbon atoms, which is preferably in 4-position with regard to the carboxyl group which is incorporated in the complex arrangement, can be prepared in an almost single-step and therefore simple process by heating a mixture of an o,o'-dihydroxy azo dyestuff which is free from sulfonic acid groups and corresponds to the formula (2)

and an o-carboxy-o'-hydroxy axo dyestuff which is free from sulfonic acid groups and which corresponds to the formula (3)

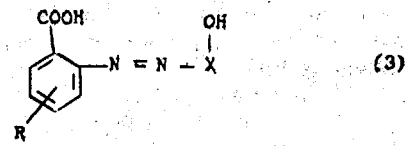

in which A, B, X and R are defined as above, in a molar ratio of dyestuff (2) to dyestuff (3) of from 1 : 0.75 to 1 : 1, with a 1.0 to 1.1-molar amount of chromium-III chloride, calculated on o,o'-dihydroxy azo dyestuff, in an organic solvent, preferably n-butanol or ethylene glycol or in a mixture thereof, at a temperature of from 105° to 120°C, until the o,o'-dihydroxy azo dyestuff portion is completely metallized, and subsequently heating the mixture to a temperature of from 70 to 90°C at a pH-value of from 5.0 to 6.5, where required after addition of water. Further in the formula (1) A is phenylene unsubstituted by sulfonic acid or phenylene unsubstituted by sulfonic acid and substituted by chlorine, nitro, methyl, β-hydroxyethylsulfonyl, sulfonamide, N,N-di(lower alkyl)sulfonamide, dinitro or chloro and nitro, B and X each is naphthylene, phenyl-methyl-pyrazolone, dichlorophenyl-methyl-pyrazolone, β-hydroxyethyl-sulfonylphenyl-methyl-pyrazolone or acetoacetyl-phenylamide and R is hydrogen, chlorine, carboxyl, sulfonamide or β-hydroxyethylsulfonyl.

The feasibility of the process resides in the fact that the metallizing reaction, in which hydrochloric acid is set free from the chromium-III chloride by the complex formation with the o,o'-dihydroxy azo dyestuff, yields neither 1:1-nor symmetrical 1:2-chromium complex compounds of the o-carboxy-o'-hydroxy-azo dyestuff. On the contrary, under these conditions, metallization starts exclusively on the o,o'-dihydroxy azo dyestuff whilst the o-carboxy-o'-hydroxy azo dyestuff present in the mixture remains unmetallized or part thereof reacts with the 1:1-chromium complex compound of the o,o'-dihydroxy azo dyestuff already formed to yield the unsymmetrical 1:2-chromium complex compound.

The monoazo dyestuffs of the above-mentioned formulae (2) and (3) are prepared in known manner by diazotizing 2-aminophenol or derivatives of 2-aminobenzoic acid and coupling with the coupling component B or X. The dyestuff mixture to be used for the chroming reaction may be prepared by mixing the individual dyestuffs (2) and (3) or preferably by mixed coupling in such a manner as first to diazotize the 2-aminobenzoic acid or an R-substituted derivative thereof and then to couple it with the coupling component H-X-OH, to add the coupling component H-B-OH to this coupling mixture and finally to combine it with the diazotized 2-amino-phenol derivative.

For chroming purposes the dyestuffs are introduced in the form of dry powders or of moist filter cakes into solutions of chromium-III chloride in n-butanol or ethylene glycol. The chroming agent is chromium-III chloride hexahydrate or chromium- III chloride, which is prepared by dissolving sodium dichromate dihydrate in a small amount of ethylene glycol, diluting the solution with n-butanol or ethylene glycol and effecting reduction by dropwise addition of the 8-molar amount of hydrogen chloride in the form of a 37% hydrochloric acid, calculated on 1 mol of dichromate, and finally heating to 105°–120° with azeotropic distillation of n-butanol/water, or if ethylene glycol is used as a solvent, with distillation of water in vacuo until complete chroming of the o,o'-dihydroxy azo dyestuff present in the mixture is reached. The mixture is then cooled to 70°–90°C and the pH-value of the batch is adjusted to 5.0–6.5 by means of sodium acetate or sodium hydroxide solution, where required by adding water; the mixture is then heated at the indicated temperature until the remaining o-carboxy-o'-hydroxy azo dyestuff has entirely reacted with the 1:1-chromium complex compound of the o,o'-dihydroxy azo dyestuff still present in the mixture.

The following Examples serve to illustrate the invention, the parts and percentages being by weight unless stated otherwise.

EXAMPLE 1

15.0 Parts of crystallized sodium dichromate (Na$_2$Cr$_2$O$_7$—2H$_2$O) were dissolved in 20 parts by volume of glycol, 500 parts by volume of n-butanol were added and the solution was reduced to chromium-III chloride by dropwise adding 40.0 parts of 37% hydrochloric acid. Into this solution, a mixture of 29.9 parts of 1-(2'-hydroxy-5'-chlorophenyl)-azo-2-naphthol (dyestuff 2) and 29.2 parts of 1-(2'-carboxyphenyl)-azo-2-naphthol (dye-stuff 3) was introduced, the mixture was heated while stirring to an external temperature of 130°C while the azeotropical mixture of n-butanol/water was distilled off until the internal temperature had risen to 108°C. Refluxing was continued for an hour until the portion of the non-metallized o,o'-dihydroxy azo dyestuff (2) had disappeared. After cooling to 80°C, 16.0 parts of crystallized sodium acetate and 50 parts by volume of water were added and the pH-value was adjusted to 5.5 by means of concentrated sodium hydroxide solution. After a reaction time of 2 hours at 80°C, the reaction yielding the 1:2-chromium complex compound was complete. After addition of 500 parts by volume of water, n-butanol/water was distilled off in vacuo and the dyestuff was isolated from the remaining aqueous suspension by suction-filtration. A grey black powder was obtained, which yielded from an aqueous dispersion on wool, reddish grey dyeings having a very good fastness to light and wet processing.

The dyestuff corresponds to the formula

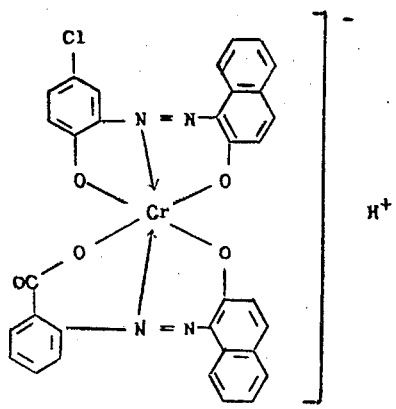

EXAMPLE 2

15.0 Parts of crystallized sodium dichromate (Na$_2$Cr$_2$O$_7$ . 2 H$_2$O) were dissolved while stirring in 200 parts by volume of glycol and the solution was reduced to chromium-III chloride by dropwise adding 40.0 parts of 37% hydrochloric acid. A mixture of 33.9 parts of 4-(2'-hydroxy-4'-nitrophenyl)-azo-1-phenyl-3-methyl-pyrazol-5-one and 29.3 parts of 4-(2', 5'-dicarboxyphenyl)-azo-1-phenyl-3-methyl-pyrazol-5-one was introduced into this solution and the mixture was heated for 5 to 6 hours under a reduced pressure of 300 mm mercury first to an internal temperature of 100°C, while water distilled off, and then further to 120°C until the o,o'-dihydroxy azo dyestuff had disappeared. The mixture was then cooled to 80°C, 16.0 parts of crystallized sodium acetate were added and the pH-value was adjusted to 5.5 by means of concentrated sodium hydroxide solution. The reaction yielding the 1:2-chromium complex compound was complete after 2 hours at 80°C. After dilution with 800 parts by volume of water and cooling to room temperature, the precipitated dyestuff was suction-filtered. A reddish brown powder was obtained, which yielded, from an aqueous dispersion on polyamide fiber material, yellowish red dyeings having a very good fastness to light and wet processing.

The dyestuff corresponds to the formula

HOE 71/F 103

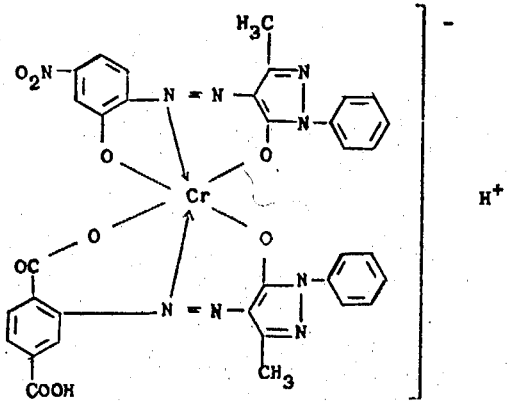

EXAMPLE 3

28.0 Parts of chromium-III chloride hydrate were dissolved while stirring in 500 parts by volume of n-butanol and a mixture of 30.9 parts of 1-(2'-hydroxy-5'-nitrophenyl)-azo-2-naphthol (2) and 29.5 parts of 4-(2',5'-dicarboxyphenyl)-azo-1-phenyl-3-methyl-pyrazol-5-one (3) was added. The mixture was heated at an external temperature of 130°C, while the azeotropical mixture of n-butanol and water was distilled off until the internal temperature had risen to 107°C. Subsequently, refluxing was continued for 2 hours until the portion of metal-free o,o'-dihydroxy azo dyestuff (2) had disappeared. The mixture was then cooled to 80°C, 16 parts of crystallized sodium acetate and 50 parts by volume of water were added and the pH was adjusted to 5.5 by means of concentrated sodium hydroxide solution. After a reaction time of 3 hours at 80°C the reaction yielding the 1:2-chromium complex compound was complete. After addition of 500 parts by volume of water, n-butanol/water was distilled off in vacuo and the dyestuff was isolated from the remaining n-butanol-free suspension by suction-filtration. The dyestuff, when dyed from a weakly acid aqueous dispersion, yielded on wool brown dyeings having very good fastness to light and wet processing. It corresponds to the formula

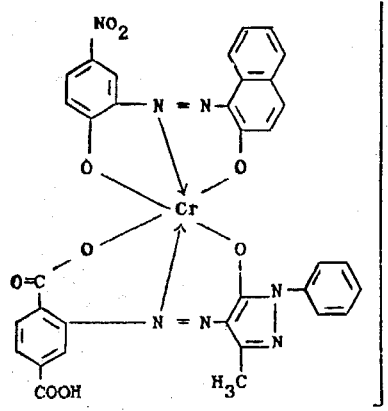

The compounds cited in the following Table were prepared according to the process disclosed in Example 1 to 3.

We claim:
1. A process for the preparation of a dyestuff consisting essentially of an unsymmetrical 1:2-chromium complex azo dyestuff of the formula

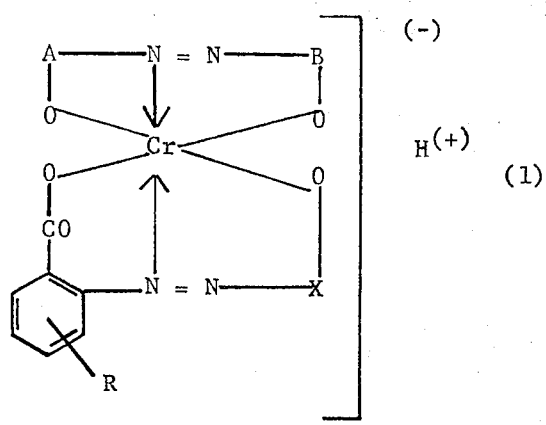

wherein A is phenylene unsubstituted by sulfonic acid or phenylene unsubstituted by sulfonic acid and substituted by chlorine, bromine, nitro, methyl, ethyl, methoxy, ethoxy, sulfamoyl or carbamoyl, B and X each is naphthalene, pyrazolone or acetoacetyl-phenylamide each of which is unsubstituted by sulfonic acid, and R is hydrogen, chlorine, bromine, methyl, β-hydroxyethylsulfonyl, carboxyl, sulfamoyl, sulfo-N-monoalkylamino or sulfo-N-dialkylamino in which said alkyl is of one to four carbon atoms, which process comprises heating a mixture of an o,o'-dihydroxy azo compound of the formula

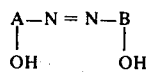

and an o-carboxy-o'-hydroxy azo compound of the formula

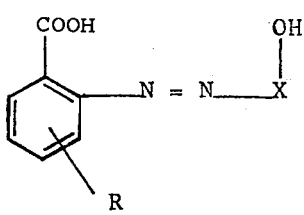

said compounds of the formulas (2) and (3) being unsubstituted by sulfonic acid, in a molar ratio of said compound of the formula (2) to said compound of the formula (3) in the range of about 1:0.75 to about 1:1 with about 1.0 to 1.1 molar amount of chromium-III compound, calculated on the compound of formula (2), in an organic solvent to a temperature of about 105°C. to about 120°C. to completely metallize said compound of the formula (2), and then heating said mixture at a pH of about 5.0 to about 6.5 at a temperature of about 70°C. to about 90°C. to form said unsymmetrical dyestuff of the formula (1).

2. A process according to claim 1 wherein said organic solvent is n-butanol.

3. A process according to claim 1 wherein said organic solvent is ethylene glycol.

4. A process according to claim 1 wherein said organic solvent is a mixture of n-butanol and ethylene glycol.

5. A process according to claim 1 wherein A is substituted by chlorine, nitro, methyl, β-hydroxyethylsulfonyl, sulfonamide, N,N-di(lower alkyl) sulfonamide, dinitro or chloro and nitro, B and X each is naphthylene, phenylmethyl-pyrazolone, dichlorophenyl-methyl-pyrazolone, β-hydroxyethylsulfonylphenyl-methyl-pyrazolone or acetoacetylphenylamide and R is hydrogen, chlorine, carboxyl, sulfonamide or β-hydroxyethylsulfonyl.

6. A process according to claim 1 wherein A stands for phenylene unsubstituted by sulfonic acid or phenylene unsubstituted by sulfonic acid and substituted by chlorine, bromine, nitro, methyl, ethyl, methoxy, ethoxy, sulfamoyl or carbamoyl, B is naphthylene, phenyl-methylpyrazolone or acetoacetyl-phenylamine and unsubstituted by sulfonic acid and X is naphthylene, phenyl-methyl-pyrazolone, acetoacetyl-phenylamide dichlorophenyl-methyl-pyrazolone or β-hydroxyethylsulfonylphenyl-methyl-pyrazolone and unsubstituted by sulfonic acid and R is hydrogen, chlorine, bromine, methyl, β-hydroxyethyl-sulfonyl, carboxyl, sulfamoyl, sulfo-N-monoalkyl-amino or sulfo-N-dialkyl-amino in which said alkyl contains 1 to 4 carbon atoms.

7. A process for the preparation of a dyestuff consisting essentially of an unsymmetrical 1:2 chromium complex azo dyestuff of the formula

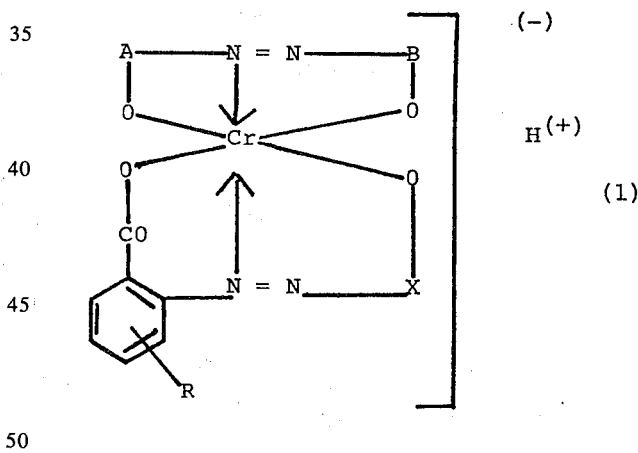

wherein A is phenyl substituted by a member selected from the group consisting of hydrogen, chlorine, nitro, chlorine and nitro, di-nitro, methyl, β-hydroxyethylsulfonyl, N,N-diethylsulfonamide and sulfonamide; B and X each is naphthylene, acetoacetyl-phenylamide or pyrazolone containing a member selected from the group consisting of hydrogen, phenyl-methyl, di-chlorophenyl-methyl and phenyl-methyl-β-hydroxyethylsulfonyl; and R is a member selected from the group consisting of hydrogen, chlorine, β-hydroxyethylsulfonyl, carboxyl and sulfonamide, which process comprises:
a. heating a mixture of an o,o'dihydroxy azo compound of the formula

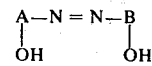

and an o-carboxy-o'-hydroxy azo compound of the formula

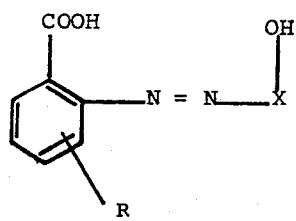

(3)

in a molar ratio of said compound of the formula (2) to said compound of formula (3) in the range of about 1 : 0.75 to about 1 : 1 with about 1.0 to 1.1 molar amount of chromium-III- calculated on the compound of formula (2), said heating being carried out in an organic solvent selected from the group consisting of n-butanol, ethylene glycol and mixtures thereof at a temperature of about 105°C. to about 120°C. to substantially completely metallize said compound of the formula (2);

b. then adjusting the pH of the mixture to about 5.0 to 6.5; and c. heating said mixture at a temperature of about 70°C. to about 90°C. to form said unsymmetrical dyestuff consisting essentially only of the dyestuff of the formula (1).

8. The process of claim 7 wherein B is naphthalene.

9. The process of claim 7 wherein B is acetoacetyl-phenylamide.

10. The process of claim 7 wherein B is phenyl-methyl-pyrazolone.

11. The process of claim 7 wherein B is dichlorophenyl-methyl-pyrazolone.

12. The process of claim 7 wherein X is naphthalene.

13. The process of claim 7 wherein X is acetoacetyl-phenylamide.

14. The process of claim 7 wherein X is phenyl-methyl-pyrazolone.

15. The process of claim 7 wherein X is dichlorophenyl-methyl-pyrazolone.

* * * * *